(12) United States Patent
McGuire

(10) Patent No.: US 6,266,452 B1
(45) Date of Patent: Jul. 24, 2001

(54) IMAGE REGISTRATION METHOD

(75) Inventor: Morgan S. McGuire, Waltham, MA (US)

(73) Assignee: NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/271,643

(22) Filed: Mar. 18, 1999

(51) Int. Cl.$^7$ ........................................................ G06K 9/32

(52) U.S. Cl. .......................... 382/294; 382/280; 382/295; 382/296; 382/298

(58) Field of Search ..................................... 382/294, 295, 382/298, 300, 264, 254, 293, 266, 276, 277, 278, 280, 289, 170, 124, 296, 297, 299; 359/29; 348/42

(56) References Cited

U.S. PATENT DOCUMENTS

| 4,776,023 | | 10/1988 | Hamada et al. | 382/147 |
| 4,864,629 | | 9/1989 | Deering | 382/216 |
| 5,063,604 | * | 11/1991 | Weiman | 382/170 |
| 5,150,429 | | 9/1992 | Miller et al. | 382/275 |
| 5,187,598 | * | 2/1993 | Posluszny | 359/29 |
| 5,479,537 | | 12/1995 | Hamashima et al. | 382/266 |
| 5,613,013 | * | 3/1997 | Schuette | 382/124 |
| 5,706,416 | * | 1/1998 | Mann et al. | 345/427 |
| 5,867,609 | | 2/1999 | Shamoon et al. | 382/278 |
| 5,914,990 | * | 6/1999 | Soderkvist | 375/350 |
| 6,076,004 | * | 6/2000 | Kanayama et al. | 600/410 |
| 6,118,475 | * | 9/2000 | Iijima et al. | 348/42 |

OTHER PUBLICATIONS

B. Reddy et al., "An FFT–Based Technique for Translation, Rotation, and Scale Invariant Image Registration," *IEEE Transactions on Image Processing*, vol. 5, No. 8, pp. 1266–1271 (Aug. 1996).

D. Lee et al., "Analysis of Sequential Complex Images, Using Feature Extraction and Two–Dimensional Cepstrum Techniques," *Journal of the Optical Society of America*, vol. 6, No. 6, pp. 863–870 (Jun. 1989).

E. De Castro et al., "Registration of Translated and Rotated Images Using Finite Fourier Transforms," *IEEE Transactions on Pattern Analysis and Machine Intelligence*, vol. PAMI–9, No. 5, pp. 700–703 (Sep. 1987).

S. Alliney, "Digital Analysis of Rotated Images," *IEEE Transactions on Pattern Analysis and Machine Intelligence*, vol. 15, No. 5, pp. 499–504 (May 1993).

Q.S. Chen et al., "Symmetric Phase–Only Matched Filtering of Fourier–Mellin Transforms for Image Registration and Recognition," *IEEE Transactions on Pattern Analysis and Machine Intelligence*, vol. 16, No. 12, pp. 1156–1168 (Dec. 1994).

H. Stone et al., "A Note on Translation, Rotation, and Scale Invariant Image Registration", *NEC Research Institute Technical Report*, No. 97–115R (Jul. 1997).

S. Alliney et al., "Digital Image Registration Using Projections," *IEEE Transactions on Pattern Analysis and Machine Intelligence*, vol. PAMI–8, No. 2, pp. 222–233 (Mar. 1986).

L. Brown, "A Survey of Image Registration Techniques," *ACM Computing Surveys*, vol. 24, No. 4, pp. 325–376 (Dec. 1992).

(List continued on next page.)

*Primary Examiner*—Leo Boudreau
*Assistant Examiner*—Kanji Patel
(74) *Attorney, Agent, or Firm*—Andrew G. Isztwan, Esq.

(57) ABSTRACT

A method for registering a pattern image with a reference image is provided. The pattern image and the reference image differ from each other by a Rotation-Scale-Translation (RST) transformation defined by a scale factor s, a rotation factor $\phi$, and a translation vector ($\Delta x$, $\Delta y$). A Fourier-Mellin invariant is used to perform image registration by isolating the rotation, scale and transformation parameters of the RST transformation between the reference image r and the pattern image p.

22 Claims, 9 Drawing Sheets

OTHER PUBLICATIONS

G. Strang et al., *Wavelets and Filter Banks*, Wellesley–Cambridge Press, pp. 15–35 (1996).

H. Stone, "Progressive Wavelet Correlation Using Fourier Methods," *IEEE Transactions on Signal Processing*, vol. 47, No. 1, pp. 97–107 (Jan. 1999).

M. McGuire et al., "Techniques for Multiresolution Image Registration in the Presence of Occlusions," *Proceedings of the 1997 Image Registration Workshop*, pp. 101–122 (Nov. 1997).

* cited by examiner

IMAGE REGISTRATION METHOD

FIELD OF THE INVENTION

The present invention relates to the field of imaging, and in particular to a novel method for registering images.

BACKGROUND OF THE INVENTION

A. Image Registration

Image registration is the process of aligning a pattern image over a reference image so that pixels present in both images are disposed in the same location. This process is useful, for example, in the alignment of an acquired image over a template, a time series of images of the same scene, or the separate bands of a composite image ("coregistration"). Two practical applications of this process are the alignment of radiology images in medical imaging and the alignment of satellite images for environmental study.

In typical image registration problems, the reference image and the pattern image are known or are expected to be related to each other in some way. That is, the reference image and the pattern image are known or are expected to have some elements in common, or to be related to the same subject or scene. In these typical image registration problems, the sources of differences between the two images can be segregated into four categories:

1. Differences of alignment: Differences of alignment between images are caused by a spatial mapping from one image to the other. Typical mappings involve translation, rotation, warping, and scaling. For infinite continuous domain images, these differences are a result of a spatial mapping from one image to the other. Changing the orientation or parameters of an imaging sensor, for example, can cause differences of alignment.

2. Differences due to occlusion: Differences due to occlusion occur when part of a finite image moves out of the image frame or new data enters the image frame of a finite image due to an alignment difference or when an obstruction comes between the imaging sensor and the object being imaged. For example, in satellite images, clouds frequently occlude the earth and cause occlusions in images of the earth's surface.

3. Differences due to noise: Differences due to noise may be caused by sampling error and background noise in the image sensor, and from unidentifiably invalid data introduced by image sensor error.

4. Differences due to change: Differences to change are actual differences between the objects or scenes being imaged. In satellite images, lighting, erosion, construction, and deforestation are examples of differences due to change. In some cases, it may be impossible to distinguish between differences due to change and differences due to noise.

Images are typically registered in order to detect the changes in a particular scene. Accordingly, successful registration detects and undoes or accounts for differences due to alignment, occlusion, and noise while preserving differences due to change. Registration methods must assume that change is small with respect to the content of the image; that is, the images being registered are assumed to be "visibly similar" after accounting for differences due to alignment, occlusion, and noise. In addition, a sufficient amount of the object or scene must be visible in both images. For example, it may be assumed that at least 50% of the content of the reference image is also present in the pattern image to be registered against it. In practice, medical and satellite sensors can usually be oriented with enough precision for images to share 90% or more of their content.

B. Rotation-Scale-Translation Transformations

The present invention provides an efficient method for registering two images that differ from each other by a Rotation-Scale-Translation ("RST") transformation in the presence of noise and occlusion from alignment. The RST transformation is expressed as a combination of three transformation parameters: a single translation vector, a single rotation factor, and a single scale factor, all operating in the plane of the image. The invention recovers these three parameters from the two images, thereby permitting the pattern image to be registered with the reference image by "undoing" the rotation, scale and translation of the pattern image with respect to the reference image. The invention also encompasses novel methods for recovering the rotation or scale factors alone, which may be useful where it is known that the alignment between the reference and pattern images is affected by only one of these factors.

The RST transformation is expressed as a pixel-mapping function, M, that maps a reference image r into a pattern image p. In practice, these functions operate on finite images and can only account for data that does not leave or enter the frame of the image during transformation. If a two-dimensional infinite continuous reference image r and pattern image p are related by an RST transformation such that p=M(r), then each point $r(x_r, y_r)$ in r maps to a corresponding point $p(x_p, y_p)$ according to the matrix equation:

$$\begin{bmatrix} x_p \\ y_p \\ 1 \end{bmatrix} = \begin{bmatrix} s\cos\phi & -s\sin\phi & \Delta x \\ s\sin\phi & s\cos\phi & \Delta y \\ 0 & 0 & 1 \end{bmatrix} \begin{bmatrix} x_r \\ y_r \\ 1 \end{bmatrix} \quad (1)$$

Equivalently, for any pixel p(x, y), it is true that:

$$r(x, y) = p(\Delta x + s \cdot (x \cos\phi - y \sin\phi), \Delta y + s \cdot (x \sin\phi + y \cos\phi)) \quad (2)$$

In this notation, $\phi$, s, and $(\Delta x, \Delta y)$ are the rotation, scale and translation parameters, respectively, of the transformation, where $\phi$ is the angle of rotation in a counter clockwise direction, s is the scale factor, and $(\Delta x, \Delta y)$ is the translation. For finite discrete r and p, assume r and p are square with pixel area N (size $\sqrt{N} \times \sqrt{N}$). Note that an RST transformation of a finite image introduces differences due to occlusions as some data moves into or out of the image frame.

C. The Fourier-Mellin Invariant

The Fourier transform has certain properties under RST transformations that make it useful for registration problems. Let two two-dimensional infinite continuous images r and p obey the relationship given in Equation (2) above. By the Fourier shift, scale, and rotation theorems, the relationship between $F_r$ and $F_p$, the Fourier transforms of r and p, respectively, is given by:

$$F_r(\omega_x, \omega_y) = e^{j2\pi(\omega_x \Delta x + \omega_y \Delta y)/s} s^2 F_p((\omega_x \cos\phi + \omega_y \sin\phi)/s, (-\omega_x \sin\phi + \omega_y \cos\phi)/s) \quad (3)$$

Note that the complex magnitude of Fourier transform $F_p$ is $s^2$ times the magnitude of $F_r$ and it is independent of $\Delta x$ and $\Delta y$. Also, the magnitude of $F_p$ is derived from the magnitude of $F_r$ by rotating $F_r$ by $-\phi$ and shrinking its extent by a factor of s. This enables us to recover the parameters of rotation and scale through separate operations on the magnitude of $F_p$.

Equation (3) shows that rotating an image in the pixel domain by angle $\phi$ is equivalent to rotating the magnitude of its Fourier transform by $\phi$. Expanding an image in the pixel domain by a scale factor of s is equivalent to shrinking the extent of the magnitude of its Fourier transform by s and multiplying the height (amplitude) of the magnitude of the Fourier transform by $S^2$. Translation in the pixel domain has no effect on the magnitude of the Fourier transform. Because of this invariance, the magnitude of a Fourier transform is referred to as the "Fourier-Mellin invariant," and the Fourier-magnitude space is referred to as the "Fourier-Mellin domain." The Fourier-Mellin transforms, R and P, of r and p, respectively, are $R=|F_r|$ and $P=|F_p|$.

Many prior art registration techniques operate on the translation-invariant Fourier-Mellin space, then convert to polar-logarithmic ("polar-log") coordinates so that rotation and scale effects appear as translational shifts along orthogonal $\theta$ and $\log_B \rho$ axes, where B is global constant logarithm base. See B. Reddy et al., "An FFT-Based Technique For Translation, Rotation, And Scale Invariant Image Registration," *IEEE Transactions on Image Processing*, Vol. 5, No. 8, pp. 1266–1271 (August 1996); D. Lee et al., "Analysis Of Sequential Complex Images, Using Feature Extraction And Two-Dimensional Cepstrum Techniques," *Journal of the Optical Society of America*, Vol. 6, No. 6, pp. 863–870 (June 1989); E. DeCastro et al., "Registration Of Translated And Rotated Images Using Finite Fourier Transforms," *IEEE Transactions on Pattern Analysis and Machine Intelligence*, Vol. PAMI-9, No. 5, pp. 700–703 (1987); S. Alliney, "Digital Analysis of Rotated Images," *IEEE Transactions on Pattern Analysis and Machine Intelligence*, Vol. 15, No. 5, pp. 499–504 (May 1993); Q. -S. Chen et al., "Symmetric Phase-Only Matched Filtering Of Fourier-Mellin Transforms For Image Registration And Recognition," *IEEE Transactions on Pattern Analysis and Machine Intelligence*, Vol. 16, No. 12, pp. 1156–1168 (December 1994). In polar-log space, the normalized correlation coefficient of R and P as a function of shift along these axes is maximized at coordinate $(-\phi, -s)$. The one-dimensional normalized correlation coefficient at shift j is given by:

$$C(R, P)_j = \frac{\sum_{i=0}^{N-1} R(i+j)P(i) - \left(\frac{1}{N}\right)\left(\sum_{i=0}^{N-1} R(i+j)\right)\left(\sum_{i=0}^{N-1} P(i)\right)}{\sqrt{\left(\sum_{i=0}^{N-1} R(i+j)^2 - \left(\frac{1}{N}\right)\left(\sum_{i=0}^{N-1} R(i+j)\right)^2\right)\left(\sum_{i=0}^{N-1} P(i)^2 - \left(\frac{1}{N}\right)\left(\sum_{i=0}^{N-1} P(i)^2\right)\right)}} \quad (4)$$

This extends simply to two dimensional polar-log space.

Equation (3) holds for infinite images but not for finite images. If it were true for finite images, it would cost O(N log N) operations to obtain the Fourier-Mellin polar-log coefficients, and O(N log N) operations to calculate the normalized correlation coefficient (by the Convolution theorem) for all cyclic shifts of the coefficients. Rotation and scale could thus be detected in O(N log N) time. Using discrete images instead of continuous ones causes some sampling error between the two images and in the calculation of the polar-log representation.

In practice, using high-resolution images and inter-pixel interpolation can minimize these errors. Unfortunately, the theory does not hold for finite images for two reasons:

1. Occlusion error: Rotating, scaling, or translating a finite image causes some of the pixel data to move out of the image frame or some new pixel data to enter the frame.

2. Tiling error: The FFT of a finite image is taken by tiling the image infinitely in the image plane. Rotation and scale do not commute with tiling.

If an image depicts a feature against a uniform and sufficiently large background, as in FIG. 1, row A, only uniform background pixels enter and leave the image frame during transformation, so no data are lost. This is the case for some medical imagining tasks such as MRI, where the images under examination depict cross-sections of anatomy with a uniform background outside the anatomy. For images with nonuniform backgrounds or insufficient padding such as FIG. 2, row A, transformations introduce occlusion error and the correlation peak may shift to a different location or suffer significant degradation.

As noted by H. Stone et al. in "A Note On Translation, Rotation, And Scale-Invariant Image Registration," *NEC Research Institute Technical Report*, No. 97-115R (1997) for rotation and scale, and as also noted by Alliney et al. in "Digital Image Registration Using Projections," *IEEE Transactions on Pattern Analysis and Machine Intelligence*, Vol. PAMI-8, No. 2, pp. 222–233 (March 1986) for translation, the tiling error is unavoidable when taking the FFT of a tiled image, except for rotations that are an integer multiple of 90 degrees and for small translations of padded images. The Fourier transform of a discrete finite image contains a border between tiles that manifests itself in Fourier-Mellin space as a high intensity "+" shape. (See FIG. 2, row B.) This artifact is more significant than the coefficients from the remainder of the image content. Certain prior art registration methods utilize a rotationally symmetric image frame to avoid seeing this artifact in the Fourier-Mellin space. See E. DeCastro et al., supra. The present invention offers a more effective approach as will be described below and confirmed by the results of an experiment comparing both methods to the traditional approach of using an unprocessed square image.

Despite all of the sources of error, the infinite and finite cases are related closely enough for Fourier-Mellin techniques to work successfully on finite images. However, techniques reported in the literature have low peak correlations and low signal-to-noise ratio in the correlation function. See B. Reddy et al., supra; L. Brown, "A Survey Of Image Registration Techniques," *ACM Computing Surveys*, Vol. 24, No. 4, pp. 325–376 (1992).

In contrast, the present invention provides a method that achieves near unity peak correlations and a high signal-to-noise ratio in the correlation function, which together greatly improve the accuracy of registration.

SUMMARY OF THE INVENTION

Generally speaking, in accordance with the invention, a method for registering a pattern image with a reference image is provided. The pattern image and the reference image differ from each other by a Rotation-Scale-Translation (RST) transformation defined by a scale factor s, a rotation factor $\phi$, and a translation vector $(\Delta x, \Delta y)$. A Fourier-Mellin invariant is used to perform image registration by isolating the rotation, scale and transformation parameters of the RST transformation between the reference image r and the pattern image p.

In a preferred embodiment of the invention, the method includes a preprocessing phase, a scale phase, a rotation phase and a translation phase.

In the preprocessing stage, the reference image and the pattern image are transformed from a pixel domain to a Fourier-Mellin domain to provide a transformed reference and a transformed pattern, respectively. The transformed reference and the transformed pattern are then converted from Cartesian (x, y) coordinates to polar-log ($\log_B$(radius), angle) coordinates, where B is a global constant logarithm base.

In the scale phase, at least one potential scale factor is recovered. The polar-log ($\log_B$(radius), angle) reference and the polar-log ($\log_B$(radius), angle) pattern are summed along the angle axis thereof to provide a reference scale signature and a pattern scale signature, respectively. The reference scale signature is then correlated with the pattern scale signature using a normalized correlation to provide a correlated scale signature. Local maxima of the correlated scale signature are detected which comprise a set of scale signature shifts. Finally, the logarithm base B is raised to the power of each scale signature shift to provide the at least one potential scale factor. The actual scale factor is determined from the at least one potential scale factor in the translation phase.

In the rotation phase, the rotation factor $\phi$ is recovered. The polar-log ($\log_B$(radius), angle) reference and the polar-log ($\log_B$(radius), angle) pattern are summed along the $\log_B$(radius) axis thereof to provide a reference rotation signature and a pattern rotation signature, respectively. The reference rotation signature is then correlated with the pattern rotation signature using a normalized circular correlation to provide a correlated rotation signature. Lastly, the maximum value of the correlated rotation signature is detected, which comprises the rotation factor $\phi$.

In the translation phase, the actual scale factor s and the translation vector ($\Delta x$, $\Delta y$) are recovered. The pattern image is rotated by $-\phi$ to provide a rotated pattern. For each potential scale factor, the rotated pattern is rescaled by the inverse of the potential scale factor to provide a candidate pattern. For each candidate pattern, a potential translation vector is determined which, when the candidate pattern is translated by the potential translation vector, produces the highest correlation between the reference image and the translated candidate pattern. Finally, the translated candidate pattern is selected which produces the highest correlation with the reference image. The potential scale factor and the potential translation vector associated with the selected candidate pattern comprise the actual scale factor s and the actual translation vector ($\Delta x$, $\Delta y$), respectively. Accordingly, each of the RST transformation parameters is effectively recovered.

Additional embodiments are provided for recovering the remaining RST transformation parameters when either the scale factor s or the rotation factor $\phi$ are known.

Various optional filters are also provided which may be utilized in the methods of the present invention to enhance the accuracy of the image registration.

Accordingly, an object of the invention is to provide an image registration method which enables the alignment of a pattern image in correspondence with a given reference image.

Another object of the invention is to provide an image registration method which recovers the transformation parameters defining an RST transformation between two images.

A further object of the invention is to provide an image registration method that achieves high peak correlations and a high signal-to-noise ratio in the correlation function, which together greatly improve the accuracy of registration.

Other objects of the present invention will become more readily apparent in light of the following description in conjunction with the accompanying drawings.

DETAILED DESCRIPTION OF THE PREFERRED EMBODIMENTS

As noted above, the present invention provides a method for registering two images that differ from each other by a Rotation-Scale-Translation ("RST") transformation in the presence of noise and occlusion from alignment. In particular, a Fourier-Mellin invariant is used to perform image registration by isolating the rotation, scale and transformation parameters of the RST transformation between a reference image r and a pattern image p. It should be noted that while the steps and processing of the method of the present invention are preferably performed using a suitably programmed general purpose computer, such processing may also be performed in dedicated hardware or other specialized apparatus if desired. Thus, the programs, algorithms, processes, method, etc. described herein are not limited in any way to any particular computer or apparatus.

Prior to describing the method of the present invention, a discussion of Fourier-Mellin techniques on finite images will be set forth which will be helpful to a fuller understanding of the invention.

A. Fourier-Mellin Techniques on Finite Images

This section shows that the cumulative errors discussed above from all sources can be small for artificial idealized images with specific characteristics when using naïve Fourier-Mellin techniques. However, the error is shown to be large for real, nonideal images encountered in actual practice.

Figure 1:
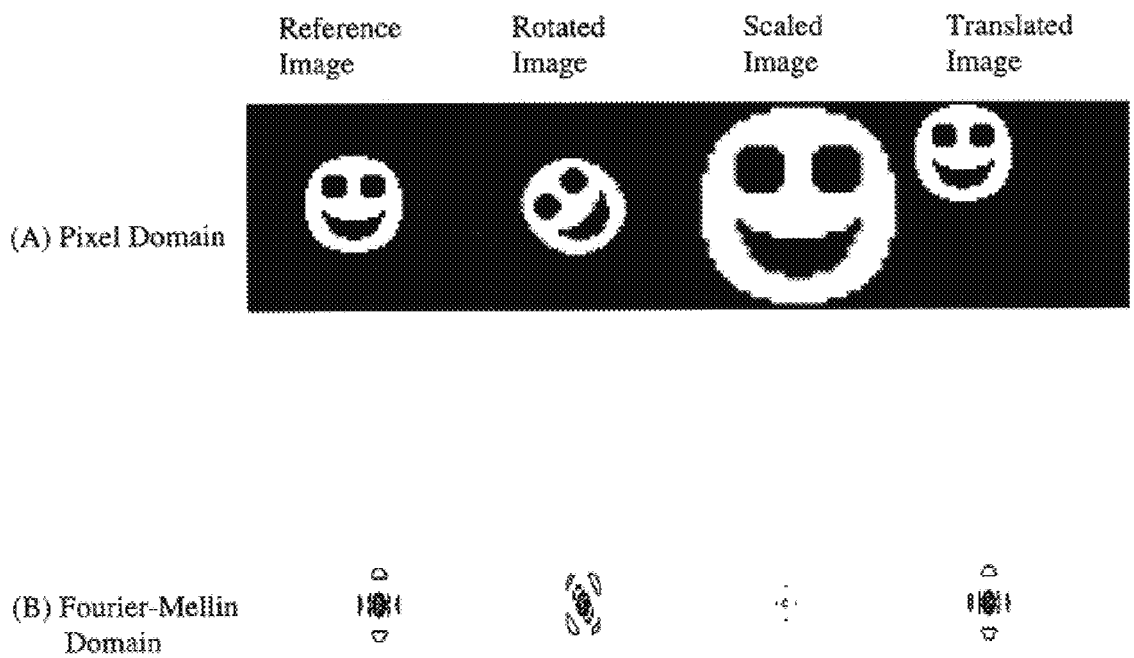
FIG. 1 shows four idealized images, including a Reference Image and rotated, scaled and translated versions of the Reference Image, in the pixel domain, (row A) and the corresponding contour plots of the nonzero coefficients of these images in the Fourier-Mellin domain; (row B)

Two experiments will be discussed which highlight the effect of the Fourier-Mellin invariance property on finite images. The first experiment, shown in FIG. 1, examines a member of the class of ideal images that behave much like an infinite-image in Fourier-Mellin space. The high contrast, simple images with uniform (black) background shown in row A of FIG. 1 are representative of a class of ideal images that are generally circular and are placed on a contrasting background. The second experiment, shown in FIG. 2, examines a member of a class of realistic satellite images. The low-contrast, detailed images that fill the image frames shown in row A of FIG. 2 are typical of satellite and some medical imaging and are representative of the class of realistic, nonideal images for which the error is nonnegligible.

FIG. 1, row A, shows four images arranged horizontally from left to right as follows: (1) a 64×64 pixel idealized finite discrete Reference Image; (2) a Rotated Image, corresponding to the Reference Image rotated by an angle of 45°; (3) a Scaled Image, corresponding to the Reference Image scaled by a factor of 2.00; and (4) a Translated Image, corresponding to the Reference Image translated by (−16, −16) (pixels). To minimize the error introduced by rotating and scaling discrete images, linear interpolation was used in calculating the pixel values for the Rotated and Scaled images. FIG. 1, row B, shows a contour plot of the nonzero Fourier-Mellin coefficients of each of the four images, where the effects of the transformations (rotation, scale, translation) can be observed. Note that for this Reference Image, rotation by angle $\phi$ in the pixel domain is approximately equivalent to rotation by $-\phi$ in the Fourier-Mellin domain. Expanding by s in the pixel domain is approximately equivalent to shrinking by s and multiplying the amplitude by $s^2$ in the Fourier-Mellin domain. Translation has no effect. By inspection, it is clear that the Fourier-Mellin transforms in FIG. 1 exhibit properties that are close to those of transforms of infinite images to recover rotation and scale parameters.

Figure 2:
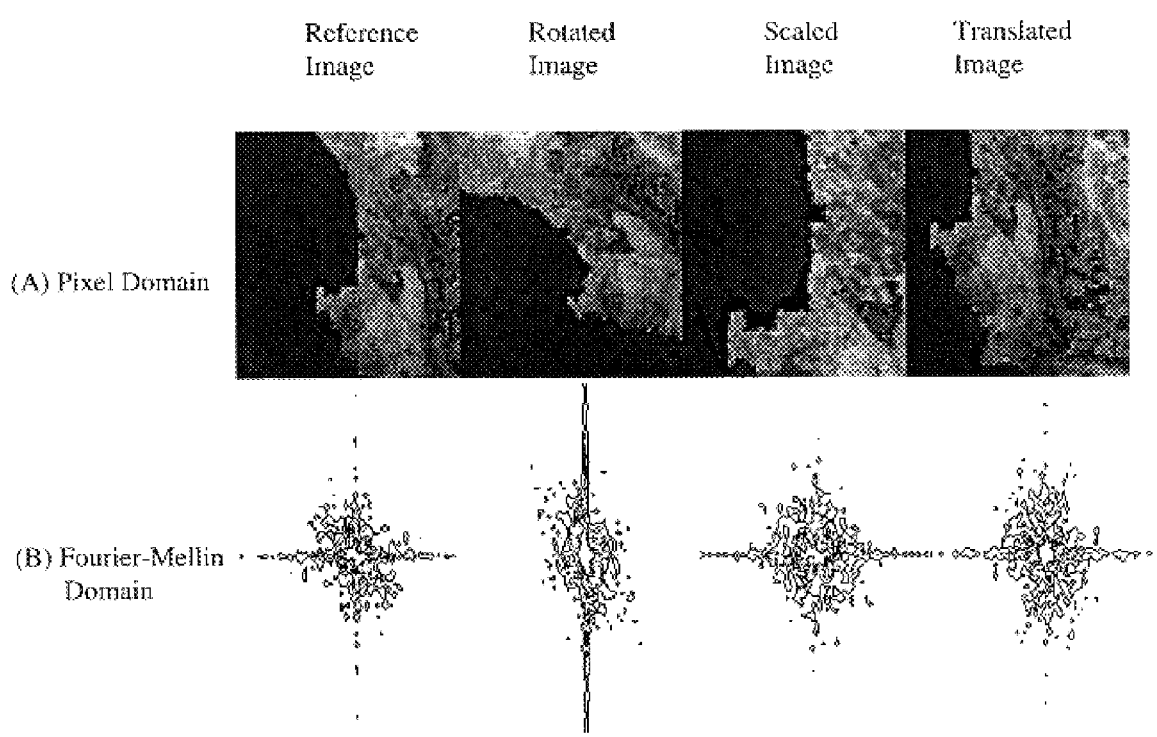
FIG. 2 shows four realistic images, including a Reference Image and rotated, scaled and translated versions of the Reference Image, in the pixel domain, (row A) and the corresponding contour plots of the nonzero coefficients of these images in the Fourier-Mellin domain; (row B)

FIG. 2 depicts the results of the same experiment performed on an actual satellite image. FIG. 2, row A, shows a 64×64 pixel satellite image ("Reference Image") subject to the same transformations (rotation, scale, translation) as the simple Reference Image in FIG. 1, row A. FIG. 2, row B, shows the Fourier-Mellin transforms of the images in FIG. 2, row A. Note that the "+" shaped artifact obscures the movement of the coefficients that are rotated or scaled. The Fourier-Mellin transform of the Translated Image is not identical to the transform of the original Reference Image, so the Fourier-Mellin domain is not invariant to translation.

When the pixel-level transformation, M, is a combination of rotation, scaling, and translation, the differences from the ideal (infinite case) and the actual (finite case) coefficients in Fourier-Mellin space are cumulative, hence the poor performance of prior art Fourier-Mellin-based techniques.

B. A Novel Image Registration Method

Figure 3:
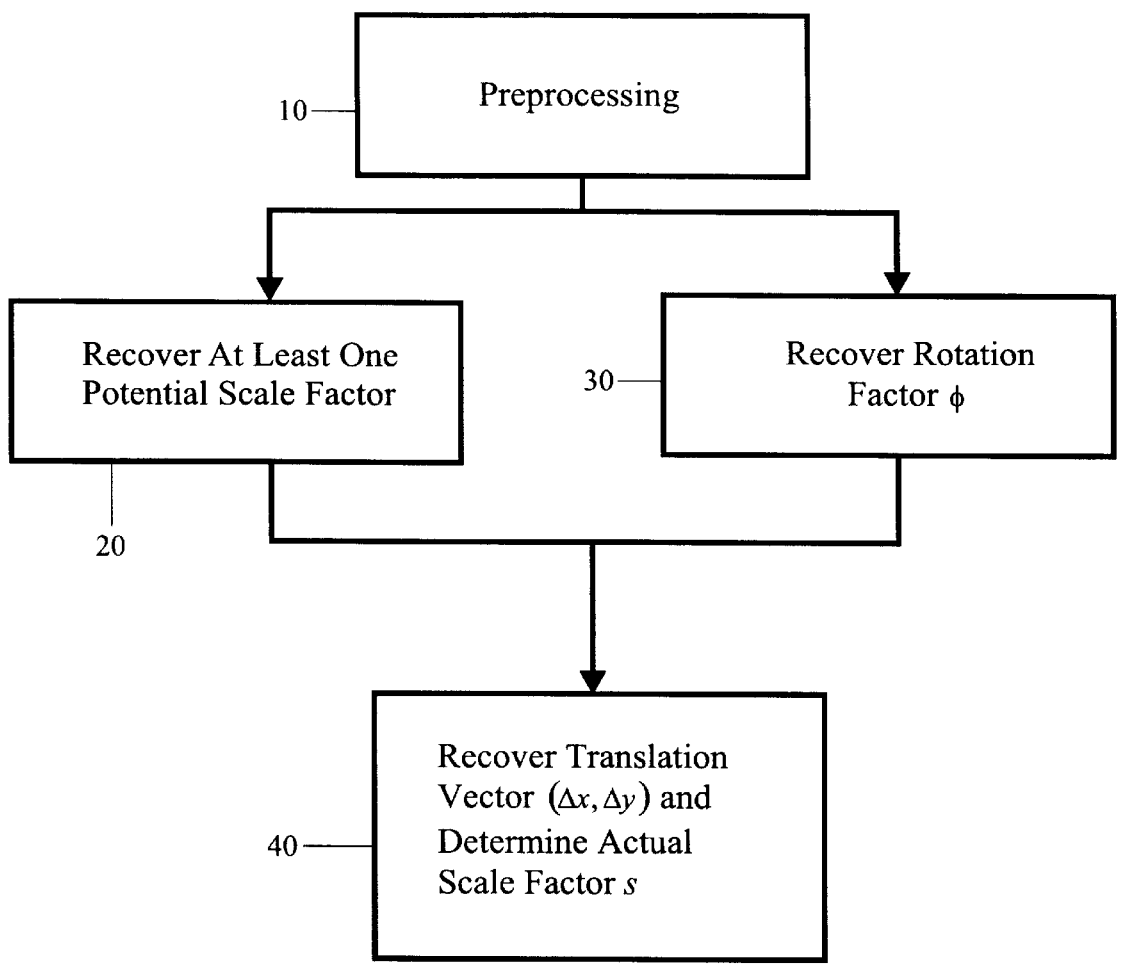
FIG. 3 is a flow chart illustrating the overall processing of the image registration method of the present invention.

The image registration method of the present invention operates in three phases, one for each of the three transformation parameters of the RST transformation: a scale factor s, a rotation factor $\phi$, and a translation vector ($\Delta x$, $\Delta y$). FIG. 3 is a flow chart illustrating the overall method. The method includes a preprocessing phase 10, a scale phase 20, a rotation phase 30 and a translation phase 40. In the preprocessing stage 10, the reference image and the pattern image are prepared and suitably transformed for use in the scale and rotation phases. In the scale phase 20, at least one potential scale factor is recovered. As will be described below, one or more potential scale factors may be recovered. If only a single potential scale factor is recovered, then this single potential scale factor is the actual scale factor s. The method also includes a rotation phase 30, in which the rotation factor $\phi$ is recovered. The method further includes a translation phase 40, in which the translation vector ($\Delta x$, $\Delta y$) is recovered. Finally, if the at least one potential scale factor recovered in the scale phase 20 includes more than one potential scale factor, the actual scale factor s is also determined from the plurality of potential scale factors in the translation phase 40. The scale phase 20 and rotation phase 30 are independent and may be performed in parallel. The translation phase 40 can proceed only after the rotation factor and the at least one potential scale factor are known.

The following discussion of the method of the present invention describes how to use filters, transformations and correlations to recover the transformation parameters for infinite continuous images. The reasons why the general theory does not completely hold for finite discrete images are discussed, and inventive methods that produce reasonable approximations are described. Finally, experimental results are presented that confirm that the method of the present invention has high accuracy and a high signal-to-noise ratio.

1. Scale Signatures and Scale Phase of Registration

The goal of the scale phase is to recover the scale factor, s, in Equation (2), or a set of potential scale factors which includes the actual scale factor. To recover this parameter in the presence of a translation and rotation, the images are mapped into a translation and rotation invariant space. In this new space a "scale signature" is computed for the image. The scale signature changes with scale and is invariant to rotation or translation for finite images. For the finite discrete case, experiments show that the scale signature is resistant to translational and rotational changes, and can therefore be used to effectively recover the scale factor s.

The mapping transform S relies fundamentally on the Fourier-Mellin translation-invariance property. In a polar-log mapping of the Fourier-Mellin domain, pixel scale and rotation operations act along orthogonal axes. Integrating along the $\theta$ axis and dividing by the product of the radius and the total image energy produces a one-dimensional function $S_r(\log_B \rho)$, that is invariant to image rotation. This one-dimensional function is the scale signature. For infinite images, the scale signature has the property that expanding or scaling the reference image by a factor of s is equivalent to translating $S_r$ by $-\log_B s$. Normalized correlations are performed on the scale signature, so the normalization factor is irrelevant, as it does not affect the location of correlation peaks. Ignoring the normalization, the transformation from r(x, y) to $S_r(\log_B \rho)$ is given by:

$$R(\rho\cos\theta, \rho\sin\theta) = R(\omega_x, \omega_y) = \left| \int\int G(r(x,y))e^{j2\pi(\omega_x x + \omega_y y)} dx\, dy \right| \quad (5)$$

$$S(r) = S_r(\log_B \rho) = \frac{1}{\rho}\int_0^\pi R(\rho\cos\theta, \rho\sin\theta)d\theta \quad (6)$$

where G is a nonlinear filter used to correct for artifacts in the finite case. For the infinite case, G is the identity filter. Note that the Fourier transform of a real image has a 180° rotational symmetry, so the integration bounds can be reduced by a factor of 2. Because any RST transformation in the pixel domain is equivalent to a translation (shift) in the S domain by $-\log_B s$, the normalized (noncircular) one-dimensional correlation coefficient between the scale signatures of two images will be 1.0 at $-\log_B s$. This means that a simple one-dimensional correlation can be used to recover the scale parameter.

For discrete images, the continuous function $S_r$ is a discrete function whose coefficients represent a summation with respect to θ over interpolated points in polar-log Fourier-Mellin space (direct Cartesian-image to polar-Fourier transforms are known which can be used to minimize the error introduced by interpolation; see, e.g., Alliney et al., supra). In the finite case, the S domain shift resulting from a scaling operation in the image domain may move some image pixels in or out of the original extent of $S_r$. The scale operation may also move some image pixels in or out of the original image frame, changing the overall amplitude of the Fourier transform as well as the individual components. The discontinuities produced by the implicit tiling of the image during the finite Fourier transform add a high-amplitude scale-invariant "+" shaped feature to the Fourier-Mellin coefficients, which will be more significant than the scaling of the image-specific coefficients and make it difficult to observe any scale change.

Figure 4:
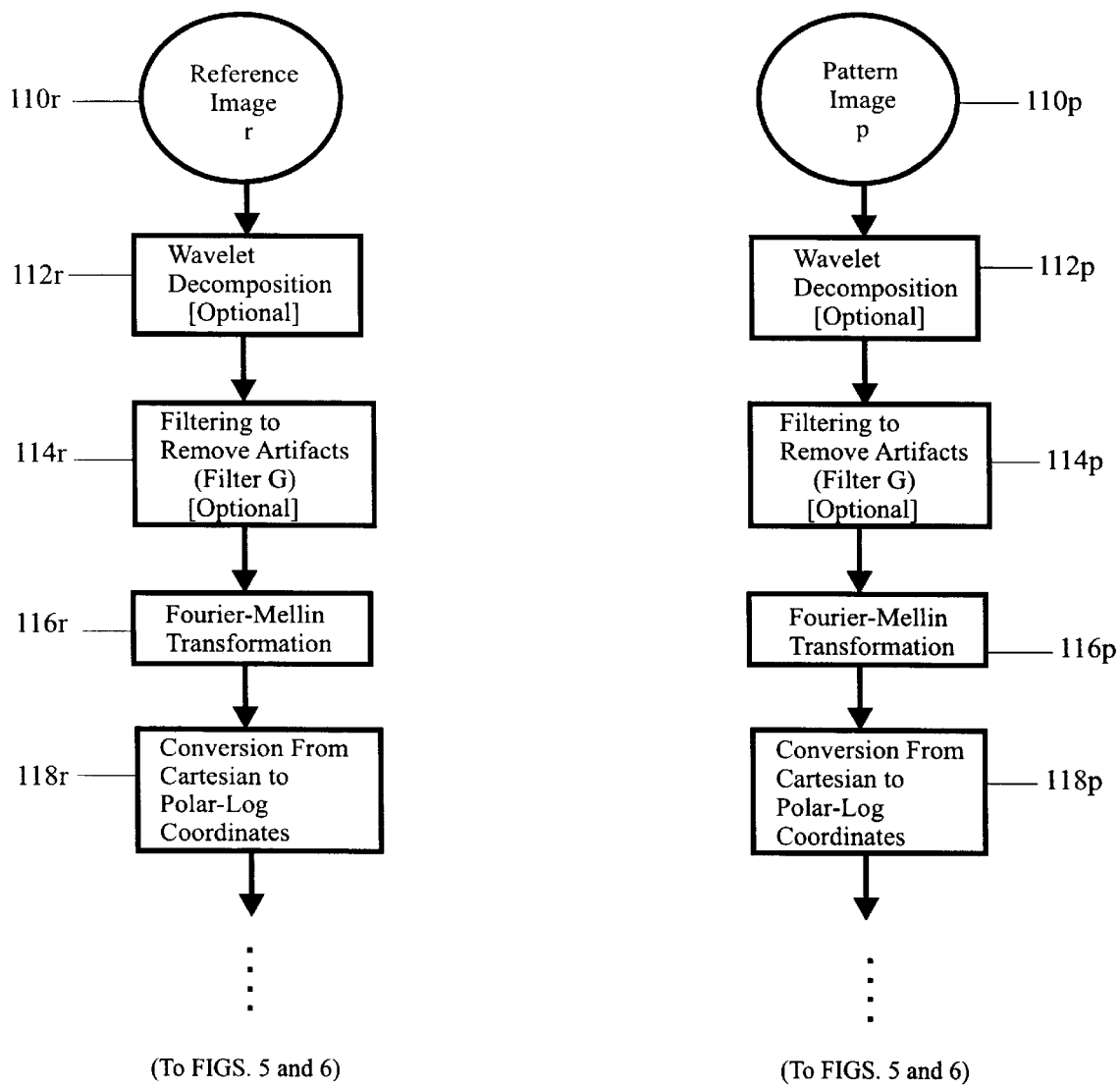
FIG. 4 is a flow chart illustrating preprocessing of a reference image and a pattern image in the image registration method of the present invention.
Figure 5:
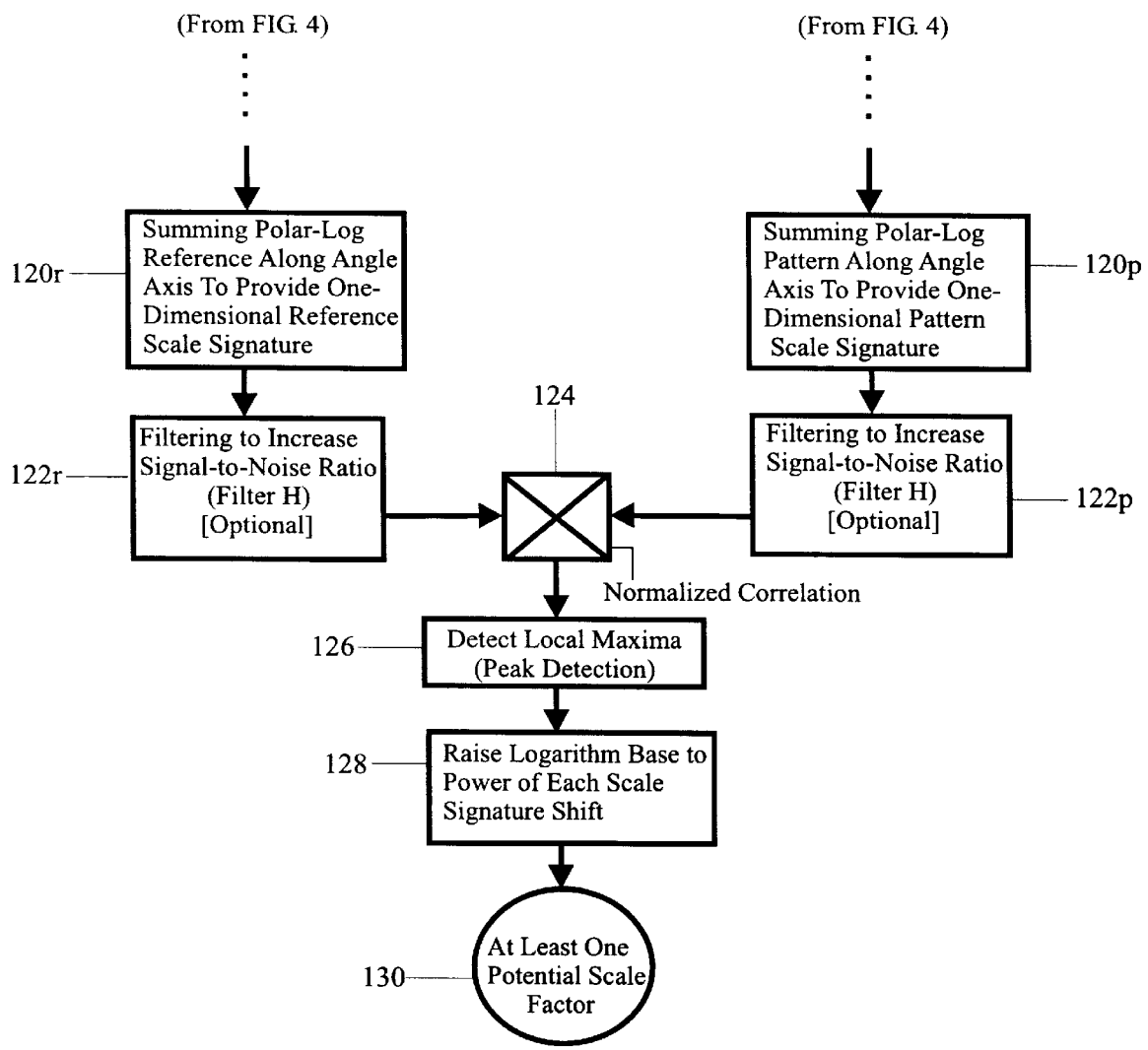
FIG. 5 is a flow chart illustrating processing to recover at least one potential scale factor in the image registration method of the present invention.

The preferred processing for recovering at least one potential scale factor (which includes the actual scale factor s) is illustrated in the flow charts of FIGS. 4 and 5. FIG. 4 shows certain preprocessing which is common to recovering both the at least one potential scale factor and the rotation factor φ. The inputs to the preprocessing are the reference image r(110$_r$) and the pattern image p(110$_p$). Each image is processed in a series of steps, several of which are similar for both the reference image and the pattern image and will be distinguished in FIGS. 4 and 5 by the subscript "r" for the reference image and the by subscript "p" for the pattern image.

Preprocessing begins with an optional step 112 in which a wavelet decomposition 112 may be performed for each image. Next, a filtering step 114 is preferably performed on each wavelet-decomposed image, in which an artifact-removing pre-filter G is used to remove artifacts which might otherwise arise during the subsequent Fourier-Mellin transformation and which would undesirably obscure real data and inhibit accurate correlation. Each image, typically in the pixel domain initially, is then subjected to a Fourier-Mellin transformation in a step 116 to transform the image to the Fourier-Mellin domain. The Fourier-Mellin transformation yields a Fourier-Mellin transformed image in Cartesian (x, y) coordinates, which is then converted to polar-log ($\log_B$(radius), angle) coordinates in a step 118, where B is a global constant logarithm base. B is an arbitrary constant, the particular value of which is not critical and may be selected in any desired manner. For example, a suitable value for B is 2. Another useful value may be calculated using the formula $B=(0.425N)^{(1/N)}$, where N is the number of discrete radial values in a particular computer representation of the ($\log_B$(radius), angle) coordinate system.

Steps 116 and 118 are preferably performed in a single operation as is known in the art and described, for example, in the article by S. Alliney, supra. As will be noted below, the preprocessing comprising steps 110 through 118 is identically performed prior to recovering the at least one potential scale factor in the scale phase 20 and prior to recovering the rotation factor φ in the rotation phase 30.

After the preprocessing is complete and the transformed images have been converted to polar coordinates, processing dedicated to recovering at least one potential scale factor proceeds as shown in FIG. 5. First, the polar-log reference and polar-log pattern generated in step 118 (FIG. 4) are each summed in a step 120 along the angle axis thereof to provide a one-dimensional reference scale signature and a one-dimensional pattern scale signature, respectively. The scale signatures may then be filtered in an optional step 122, if desired, using a filter H which stabilizes the scale signatures and increases the signal-to-noise ratio of the scale signatures to improve correlation accuracy as will be discussed below. The filtered scale signatures are then correlated in a step 124 using a normalized correlation. The normalized correlation produces a correlated scale signature having one or more local maxima (scale signature shifts), which are detected in step 126. Finally, the logarithm base B is raised to the power of each scale signature shift in a step 128, resulting in at least one potential scale factor 130. The correlation of scale signatures generally produces more than one potential scale factor. In practice, it is usually necessary to check 1 to 5 peaks during the final, translation phase 40 to identify the actual scale factor s as will be discussed below.

Although it is not always possible to recover the scale factor by examining the scale signatures of two finite discrete images, in practice an overall shift is often visible in the scale signatures if G is chosen to minimize the artifacts introduced by the finite transform. The present invention uses this observation in step 114 (FIG. 4) to attempt to recover the scale parameter.

The steps preceding the correlation 124 implement the filtered S transform. W is a wavelet decomposition used to reduce the computation bounds. The normalized correlation followed by the peak detector returns a list of S domain shifts for which the normalized correlation coefficient is a local maximum. By raising the inverse of the logarithm base B used in the polar-log mapping to the power of each of these shifts, a set of scale factors is obtained. Each of these scale factors is a likely value for the scale factor relating r and p. To determine the actual scale factor, recover the rotation parameter as described later in this section, and undo the rotation on the images, then choose the scale factor for which the translation correlation is maximized. In cases where an upper or lower bound is known on the scale factor, all candidates outside that range may be eliminated, reducing the computations required.

Assuming G is chosen such that it is O(N log N), the Fourier-Mellin transform and polar-logarithmic mapping requires O(N log N) computations. The projection onto the $\log_B \rho$ axis (integration by θ) requires N–√N additions. Thus the total computational cost for obtaining the scale signatures $S_r$ and $S_r$ is O(N log N). The one-dimensional normalized correlation and peak detection can be performed in an additional O(√N log N) operations. The entire computation can be increased in speed by a factor of $4^k$ by performing a wavelet decomposition of order k on r and p and using the low—low subbands as the input to the Fourier-Mellin transform. The low—low subband of a $k^{th}$ order wavelet decomposition is essentially the original image reduced in resolution by a factor of k along each dimension. See G. Strang et al., *Wavelets And Filter Banks*, Wellesley-Cambridge Press, pp. 15–35 (1996). Because scaling transformations are independent of resolution, using a wavelet decomposition does not substantially affect the results of registration so long as k is not so large that a majority of the features in the images fall beneath the sampling resolution. By incorporating the use of wavelets, the total cost of the scale phase of registration is $O((N \log N)4^k)$.

2. Rotation Signatures and Rotation Phase of Registration

The goal of the rotation phase is to recover the rotation parameter, φ which relates r and p in Equation (2). Just as scale signatures can be used to recover scale information in a rotation and translation-invariant domain, a similar approach can be employed for rotation. Let Φ be the transform function such that $\Phi_r=\Phi(r)$ is the translation and scale invariant rotation signature of infinite continuous r. For finite discrete images, experiments show that $\Phi$ is resistant to translation and scaling of the original image, although overall changes in magnitude may occur.

Integrating polar Fourier-Mellin coefficients along the $\rho$ axis produces a one-dimensional function of angle that is translation and scale invariant. Although $\Phi$ is not normalized for total image energy, this will not affect the normalized correlation. $\Phi(r)$ is given by:

$$\Phi(r) = \Phi_r(\theta) = \int J(R(\rho \cos \theta, \rho \sin \theta)) d\rho \qquad (7)$$

where J is a pointwise weighting function to be applied in the finite case when it is known that there is no scale factor (s=1). Assume J is 1 otherwise.

For the infinite continuous case, a rotation by angle $\phi$ in the image domain corresponds to a shift by $-\phi$ in the $\Phi$ domain. This means the normalized circular correlation of $\Phi_r$ and $\Phi_p$ will be unity at $-\phi$. Note that rotation signatures, like Fourier coefficients, have 180° rotational symmetry ($\Phi_r(\theta) = \Phi_r(\theta + \alpha\pi)$) where $\alpha$ is an integer). Thus, from the rotation signatures it is possible to determine the rotation parameter modulo 180°. If it is not known whether the rotation is larger than ±90°, it is necessary to perform a single pixel-level inverse rotation and image correlation to eliminate one of the choices. For rotationally symmetric images, the rotation signature is uniform and it is impossible to recover rotation.

The discussion of scale signatures for discrete and finite images holds for rotation signatures as well. The largest discrepancy observed between the infinite continuous and finite discrete cases is usually the "+" shaped artifact in the Fourier-Mellin coefficients. An appropriate choice of G reduces this artifact, as will be discussed below. In addition to the pixel-domain filter with G, filter J is used to weight Fourier-Mellin coefficients from edges in the image texture more strongly. Unlike the scale signatures, the correlations of rotation signatures frequently achieve a narrow peak with value near unity near the actual rotation parameter, and exhibit high signal-to-noise ratio. Because of this, it is often possible to determine the rotation parameter accurately modulo 180° using only a single peak of the normalized correlation of the rotation signatures.

Figure 6:
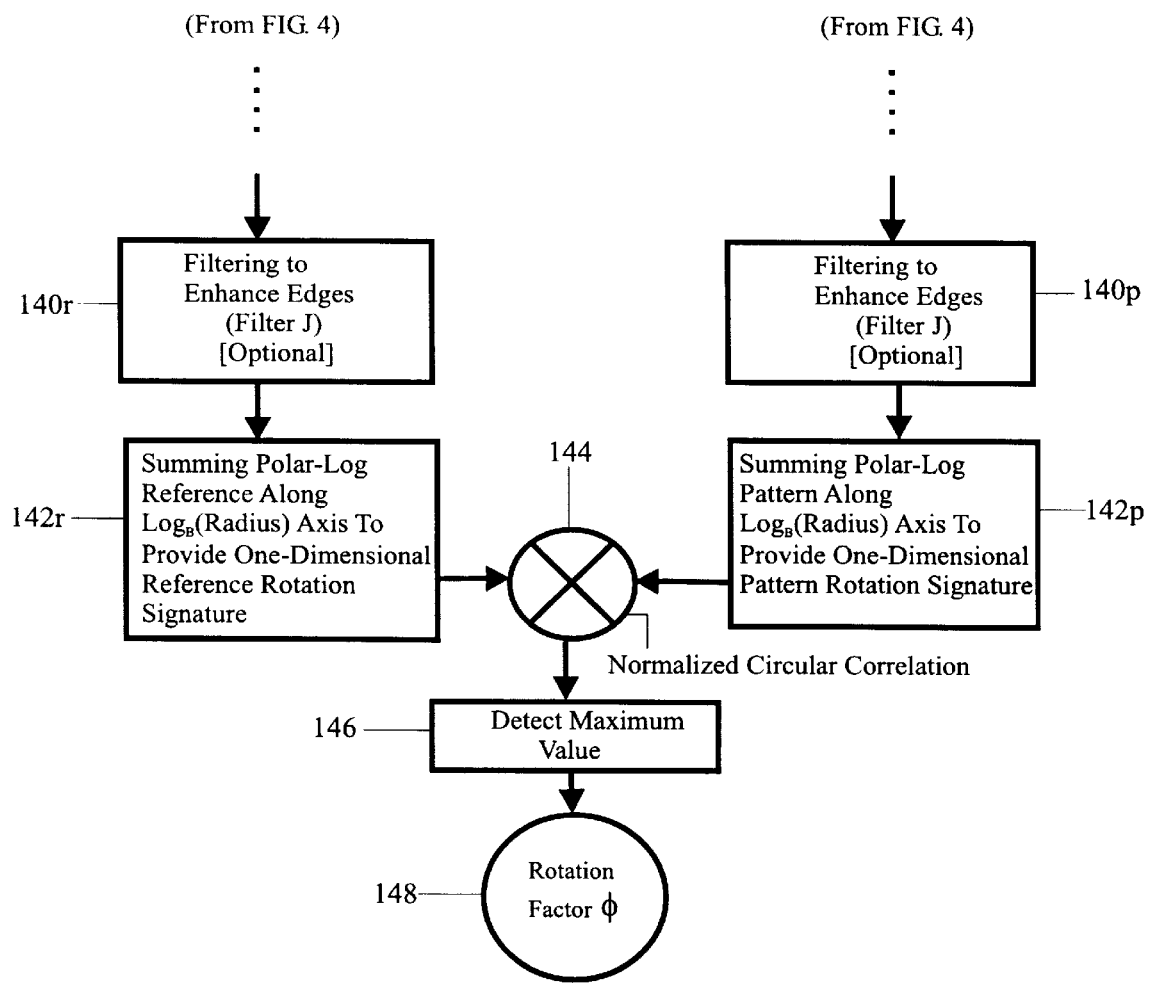
FIG. 6 is a flow chart illustrating processing to recover the rotation factor $\phi$ in the image registration method of the present invention.

The preferred processing for recovering the rotation factor $\phi$ is illustrated in the flow charts of FIGS. 4 and 6. FIG. 4 shows preprocessing, while FIG. 6 shows the preferred operations unique to the rotation phase 30. As with the scale phase, the reference image $r(110_r)$ and the pattern image $p(110_p)$ are subjected to the preprocessing shown in FIG. 4 and discussed above. Once again, each image is processed in a series of steps, an initial portion of which is similar for both images and will be distinguished in FIGS. 4 and 6 by the subscript "r" for the reference image and by the subscript "p" for the pattern image. The preprocessing of steps 110 through 118 (for both the reference image and the pattern image) is identical preceding the rotation phase 30 to the same steps performed prior to the scale phase 20. It should be noted that while these preprocessing steps may be performed separately for each phase, they are instead preferably performed once, the output of step 118 being subsequently used in both step 120 in the scale phase 20 and in step 140 in the rotation phase 30.

In the rotation phase 30, the output of step 118 may be filtered using an optional filter J in a step 140 to enhance the edges present therein. Thereafter, the polar-log ($\log_B$ (radius), angle) reference and polar-log ($\log_B$(radius), angle) pattern generated in step 118 (FIG. 4) are each summed in a step 142 along the $\log_B$(radius) axis thereof to provide a one-dimensional reference rotation signature and a one-dimensional pattern rotation signature, respectively. Next, the rotation signatures are correlated in a step 144 using a normalized circular correlation. The normalized circular correlation produces a correlated rotation signature having a single maximum value, which is detected in step 146. The angular shift that produces the maximum value is the resulting rotation factor $\phi$ 148.

The Fourier-Mellin transform ("FMT") for the rotation phase of registration is identical to the one used for the scale phase, so the O(N log N) computation need only be performed once. For rotation, the J weighting factor requires N additional multiplications if used. Projection onto the $\rho$ axis requires N–$\sqrt{N}$ additions. Thus the rotation signatures can be obtained in O(N log N) operations. The one-dimensional circular correlation costs an additional O(log N) operations. As with scale, rotation can be detected at any reasonable resolution of the image, so that the $k^{th}$-order wavelet transform of the input images allows recovery of the rotation parameter in O((N log N)/$4^k$) operations. If the same filtered Fourier-Mellin-wavelet transforms are used for the scale and rotation phases, the rotation phase requires only O(N/$4^k$) independent operations after performing the scale phase.

3. Translation Phase of Registration

Figure 7:
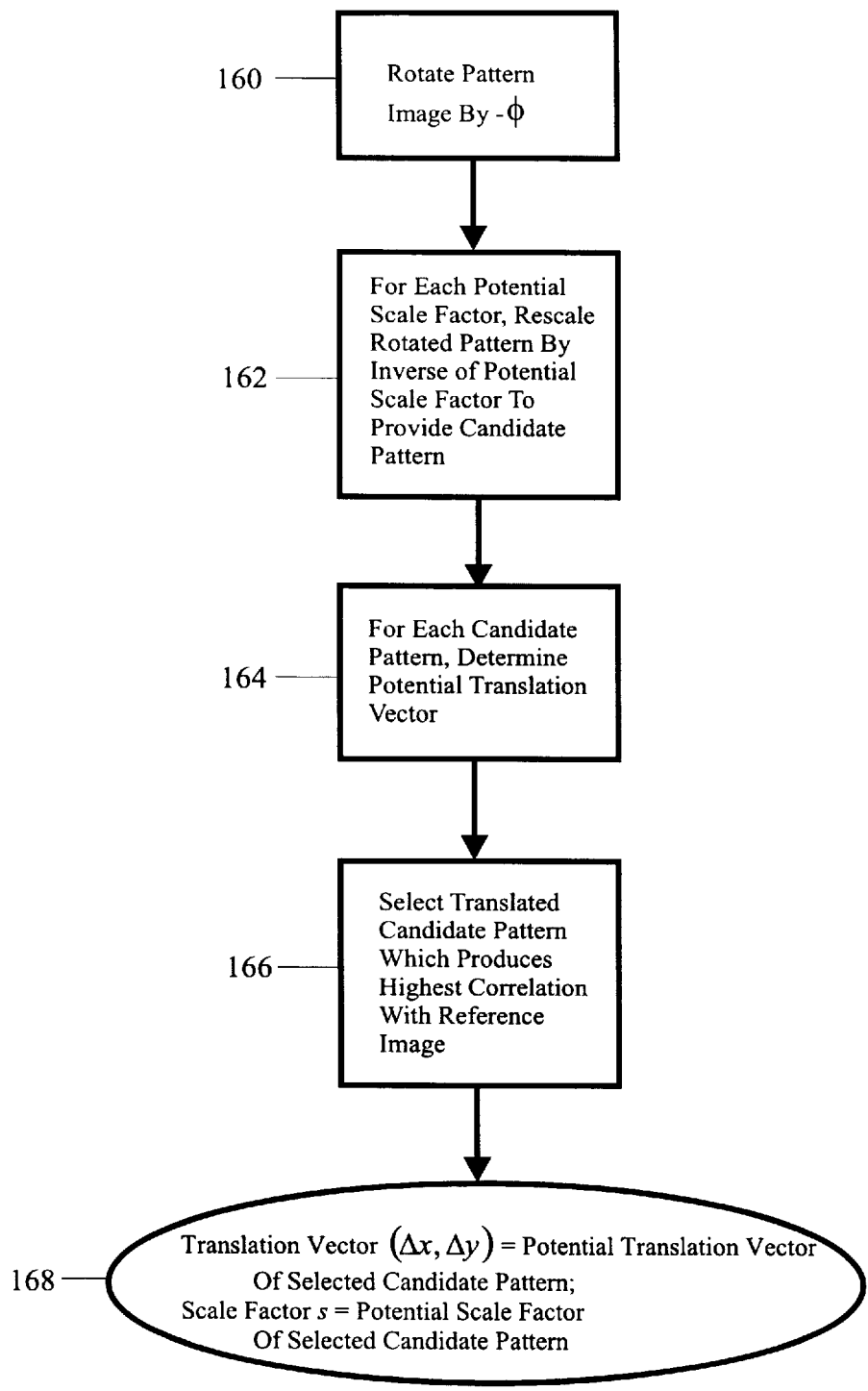
FIG. 7 is a flow chart illustrating processing to recover the translation vector ($\Delta x$, $\Delta y$) and the actual scale factor s in the image registration method of the present invention.

The goal of the translation phase is to determine the translation parameters $\Delta x$ and $\Delta y$, given the rotation factor $\phi$ and the at least one potential scale factor, as well as to determine which of the at least one potential scale factor is the actual scale factor s. The preferred processing for the translation phase 40 (FIG. 3) is shown in the flow chart of FIG. 7. The translation phase begins with a step 160 in which the pattern image is rotated by $-\phi$ to provide a rotated pattern. Thus, the rotation is "undone" in the rotated pattern. Next, for each potential scale factor, the rotated pattern is rescaled by the inverse of the potential scale factor to provide a candidate pattern (step 162). Accordingly, each candidate pattern is associated with one potential scale factor, and the effects of both rotation and scale are undone for each candidate pattern. The scale which is undone for a particular candidate pattern corresponds to the potential scale factor associated with that candidate pattern. In the next step (step 164), for each candidate pattern, a potential translation vector is determined which, when the candidate pattern is translated by the potential translation vector, produces the highest correlation between the reference image and the translated candidate pattern. See, for example, U.S. Pat. No. 5,867,609 by T. Shamoon et al., issued Feb. 2, 1999; and H. Stone, "Progressive Wavelet Correlation Using Fourier Methods," *IEEE Transactions on Signal Processing*, Vol. 47, No. 1, pp. 97–107 (January 1999). Finally, in step 166, the translated candidate pattern is selected which produces the highest correlation with the reference image. The potential scale factor and the potential translation vector associated with the selected candidate pattern comprise the actual scale factor s and the actual translation vector ($\Delta x$, $\Delta y$), respectively.

If there are data that are known to be invalid in the images, these occluded areas can be ignored during the translation phase at no additional cost by using masks m and h for r and p, respectively. These masks contain value 1 where the corresponding image pixel is valid and 0 where the corresponding pixel is invalid. These masks are allowed to take on fractional values produced by interpolation and wavelet decomposition. The case where the scale factor is known will be derived, and then it will be shown show how this case may be extended to the case where there are a number of possible scale factors. The latter case matches the actual output of the scale phase of registration.

Let r and p be infinite continuous images. Let p' be the image p after undoing the effects of rotation and scale. Let h' be the mask h after undoing the effects of rotation and scale. If the φ and s are accurately recovered, then p' differs from r by only a translational shift. For the finite case, p' and r may also differ by occlusions introduced when data moves into or out of the image frame. These occlusions are automatically taken into account by h'.

Computing the normalized correlation coefficient in the Fourier domain using binary validity masks for the case where the extent of the pattern mask is smaller than the extent of the image mask is known. See H. Stone, "Progressive Wavelet Correlation Using Fourier Methods," *IEEE Transactions On Signal Processing*, Vol. 47, No. 1, pp. 97–107 (January 1999). The normalized correlation coefficient as a function of translation of the pattern will have a near unity value at the shift that aligns the images properly. This technique has been extended to use fractional validity masks for reduced resolution representations of images. See M. McGuire et al., "Techniques For Multiresolution Image Registration In The Presence Of Occlusions," *Proceedings Of The 1997 Image Registration Workshop*, pp. 101–122 (November 1997). The normalized circular correlation coefficient for all translational shifts of images r and p' with validity masks m and h' is:

$$C(r, p')_{x,y} = \frac{(\tilde{r} \otimes \tilde{p}')_{x,y} - \left(\frac{1}{(m \otimes h')_{x,y}}\right)(\tilde{r} \otimes h')_{x,y}(m \otimes \tilde{p}')_{x,y}}{\sqrt{\left((\tilde{r}^{(2)} \otimes h')_{x,y} - \left(\frac{1}{(m \otimes h')_{x,y}}\right)(\tilde{r}^{(2)} \otimes h')_{x,y}^2\right)\left((m \otimes \tilde{p}'^{(2)})_{x,y} - \left(\frac{1}{(m \otimes h')_{x,y}}\right)(m \otimes \tilde{p}'^{(2)})_{x,y}^2\right)}} \quad (8)$$

where ⊗ denotes circular correlation, $\tilde{x} = r.*m$, and $\tilde{r}^{(2)} = r.*r.*m$, (where .* is point-by-point array multiplication). By the Convolution Theorem, this process can be efficiently computed in O(N log N) time for finite images.

Note that for finite images, Equation (8) assumes that the pattern-mask nonzero extent is less than one half of the image mask size along any one dimension. If this assumption is violated, cyclic shifts are no longer equivalent to translations and the computation cannot be performed in the Fourier domain. Computing the correlations in the pixel domain costs $O(N^2)$ operations. To avoid incurring this cost when the images are of similar size, the correlations can be computed for versions of the images and masks that are padded to double their size in each dimension. Even with this padding, Fourier techniques are usually faster than pixel techniques on unpadded images.

The translation phase of the present invention uses the recovered parameters φ and s to undo the rotation and scale on the pattern, producing p' and h' The normalized correlation coefficient for all translations is then computed by Equation (8). The location of this peak is directly related to the translation difference between r and p. If the peak occurs at a shift of (Dx, Dy), then the translation parameters for Equation (2) are:

$$\begin{bmatrix} \Delta x \\ \Delta y \\ 1 \end{bmatrix} = \begin{bmatrix} s\cos\phi & -s\sin\phi & 0 \\ s\sin\phi & s\cos\phi & 0 \\ 0 & 0 & 1 \end{bmatrix} = \begin{bmatrix} Dx \\ Dy \\ 1 \end{bmatrix} \quad (9)$$

Some care must be taken in handling the translations for which only a small portion of p' overlaps r, as these translations have very few pixels participating in the correlation, and can produce misleading results.

The translation phase requires O(N) operations to undo the scale and rotation and O(N log N) operations to perform the normalized correlation. It is recommended that registration be performed using a $k^{th}$ order wavelet to determine a coarse estimate of translation. A $k^{th}$ order wavelet decomposition resolves the registration point to within $\pm 2^{k-1}$ pixels along any dimension. Given this coarse estimate, a refined search for the exact translation can be performed at the full resolution over the $4^k$ possible fine translations that map to the same coarse translation. Under the assumption that the correlation function is smooth near the peak value, this can be reduced to examining only 2k translations with a binary search algorithm. This property is image dependent, and generally holds for images that display continuity. Using this procedure, the total cost for the translation phase is O((N log N)/$4^k$+Nk).

The above discussion considers the case where the scale factor is known. The scale phase of the method does not produce a single scale factor, however. It produces a list of likely scale factors. To determine which of the scale factors is correct, the translation phase is repeated for each of the scale factors, and the scale factor that produces the highest translation correlation peak is selected. The fine resolution search need only be applied to the scale factor that produces the highest peak in the coarse resolution search. If $n_s$ is the number of scale factors returned by the scale phase of registration, then the true cost of the translation phase is $O((n_s N \log N)/4^k+Nk)$. The total cost of recovering rotation, scale and translation is $O((n_s N \log N)/4^k+Nk)$.

4. Filters G, H and J a. Filter G

Figure 8:
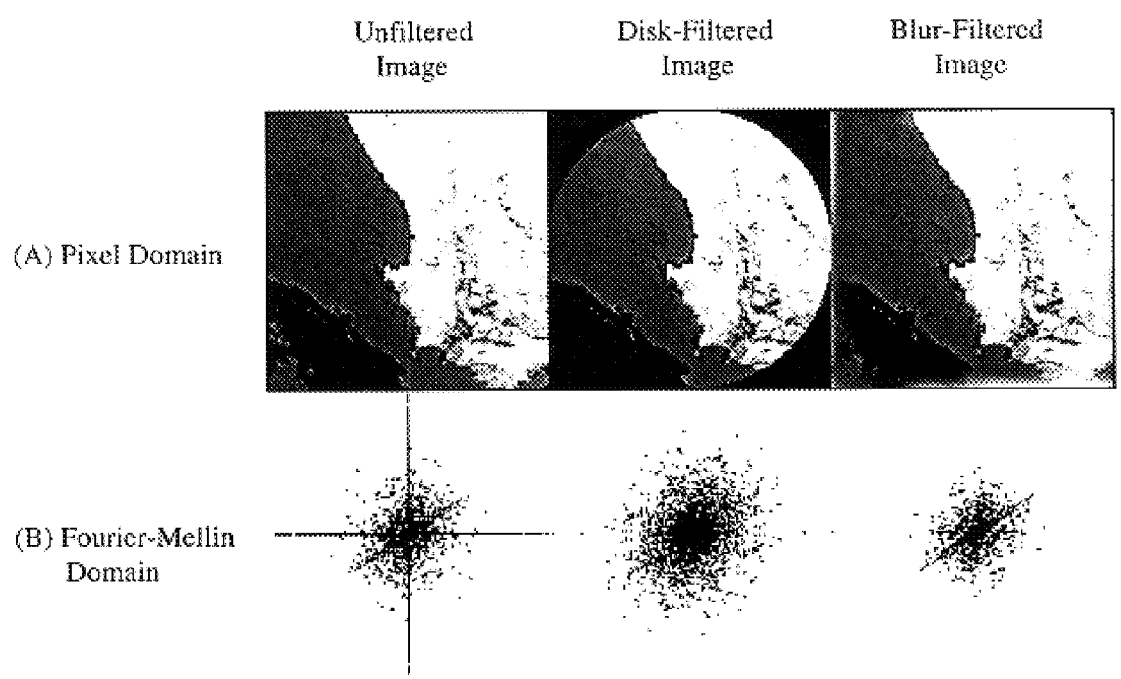
FIG. 8 shows three images, including an unfiltered image, a disk-filtered version of the unfiltered image, and a blur-filtered version of the unfiltered image, in the pixel domain (the solid black borders do not comprise part of the images, but are merely shown to denote the outer borders of each image), and the corresponding contour plots of the nonzero coefficients of these images in the Fourier-Mellin domain.

Filter G may be used to minimize the effects of the implicit tiling of finite images when the Fourier-Mellin transform ("FMT") is computed for the rotation and scale phases of registration. FIG. 8, row A, shows three versions of the same image: (1) an unfiltered image; (2) the image filtered using a "disk" filter or mask; and (3) the image filtered using a "blur" filter of the present invention. FIG. 8, row B, shows the nonzero coefficients of the Fourier-Mellin transform of these images.

Note that in the case of the unfiltered image, there is a "+" shaped artifact superimposed over the central coefficients which actually represent the texture of the image. This artifact is undesirable because it is caused solely by the implicit tiling discussed above and obscures real data, thereby inhibiting accurate correlation.

A rotationally symmetric image frame may be used to avoid this artifact. See DeCastro et al., supra. A simple experiment confirms that this is effective. The second image in FIG. 8, row A, is an image after a rotationally symmetric image frame has been applied. In this case, G is a mask shaped like a disk, which zeros out pixels outside a predetermined radius. The Fourier-Mellin transform of this disk-filtered image does not exhibit the "+" shaped artifact. However, the remaining coefficients do not exactly match those of the original image after removing the "+" artifact from the transform. Comparing the unfiltered and disk-filtered images, the disk-filtered image has a large circular edge and approximately 25% fewer pixels. Correspondingly, there is some radially distributed noise and a general change of shape in the FMT of the disk-filtered image as compared to the FMT of the unfiltered image. This reduces the correlation peak and may affect accuracy, although it is superior to the unfiltered version because the "+" artifact is removed.

Figure 9:
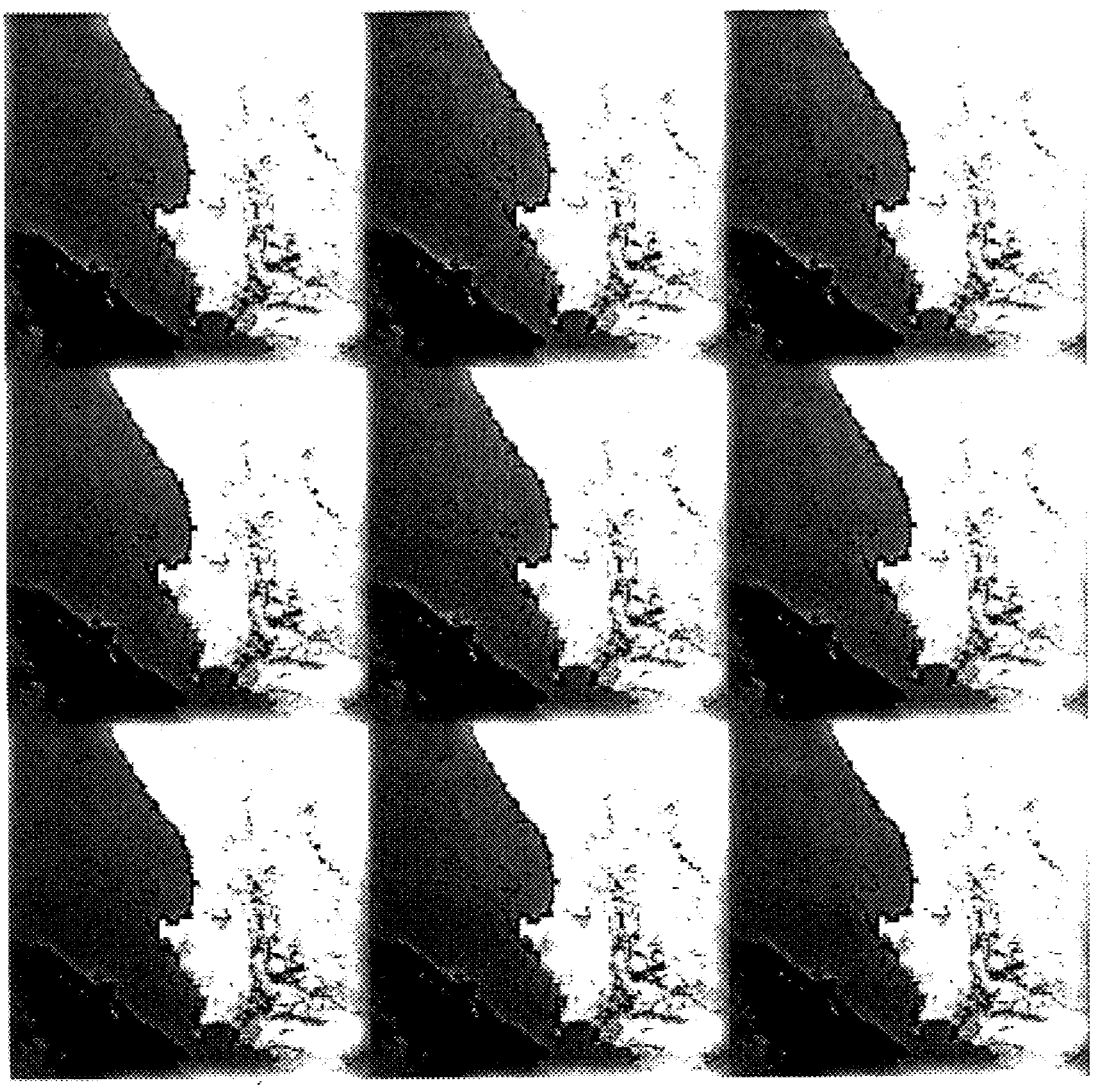
FIG. 9 shows nine copies of the blur-filtered image in FIG. 8, row A, arranged adjacent to one another, edge-to-edge, in a tile-like fashion.

The present invention includes an improvement over the use of unfiltered images or disk filters in the prior art. In particular, filter G preferably comprises a novel "blur" filter that blurs the borders of an image against the opposite borders. Very few pixels need be altered by this filter. The third image in FIG. 8, row A, is an image treated by such a blur filter. The blurring performed by the blur filter is particularly shown in FIG. 9, in which nine copies of the third image in FIG. 8, row A are arranged adjacent to one another, edge-to-edge, in a tile-like fashion. Preferably, and as shown with regard to the image in the center of FIG. 9, the blur filter interpolates pixels within a predetermined number of pixels of the border of the image to create a smooth linear transition from the right edge of the image around to the left edge of the image (or around to the left edge of a copy of the image if placed adjacent to the original image as shown in FIG. 9), and from the top edge of the image around to the bottom edge of the image (or around to the bottom edge of a copy of the image if placed adjacent to the original image as shown in FIG. 9). In an image of the size of that shown in FIG. 8, row A, the filter would preferably interpolate pixels within eight (8) pixels of the image border, but this number is not critical and may be adjusted as desired. A filter which smoothes the pixels to perform the above-mentioned transitions will suffice to achieve the desired blurring effect.

Using such a blur filter, except for the pixels near the border of the image, there is no effect, so that a majority of pixels are unchanged. The FMT of a blur-filtered image shows the nonzero Fourier-Mellin coefficients of this image. Like the disk filter, this filter successfully removes the "+" artifact, as shown in FIG. 8, row B. However, the FMT of the blur-filtered image is almost identical the FMT of the unfiltered image, but with the undesirable "+" artifact removed. Thus, a filter G that blurs edges cyclically around an image is excellent for removing the "+" artifact without significantly altering the valid Fourier-Mellin coefficients, thereby improving overall correlation accuracy.

b. Filter H

The H filter is used during the scale phase to increase the signal to noise ratio of the scale signatures before correlation. The content of a finite image may change significantly under a scale transformation because pixels move outside or inside the image frame, so H may be used to stabilize the scale signature. A filter that removes the first-order trend from the scale signature by subtracting a moving average achieves this stabilization. One way to accomplish this is to let x be a vector of length N representing image data. Let:

$$y_i = x_i - \frac{10}{N} \sum_{j=i-(N/10)}^{i+(N/10)} x_j, \text{ for } (N/10) < i < (N - (N/10)) \tag{10}$$

Using the above algorithm, the resultant vector y is the H-filtered output.

c. Filter J

Filter J is used to selectively weight the Fourier-Mellin coefficients that correspond to edges in the image. It is best to apply J only if there is no scale factor because expansion in the pixel domain shrinks the Fourier-Mellin coefficients, and they will be weighted improperly. In a polar representation of the Fourier-Mellin transform, the coefficients that correspond to image texture edges lie near the center of the ρ axis, parallel to the φ axis. The coefficients where ρ is small encode the DC offset and low frequencies in the image, and the coefficients where ρ is large represent very high frequency information and noise. A Gaussian weighting that emphasizes the edge coefficients while minimizing the DC and noise components will suppress the remains of the "+" artifact, intensity shifts in the image, and noise while emphasizing the edges of features. J may be tuned to a specific class of images to enhance performance, or eliminated for the general case of arbitrary images with arbitrary scale transformations.

5. Summary And Conclusions

The present invention performs well in the difficult cases of realistic image pairs and extreme transformations. Separating the detection of rotation, scale, and translation reduces the size of the search space. The use of progressive wavelet search and the calculation of correlations in the Fourier domain make all of the computations very efficient. Indeed, during testing, it was found that the time to produce test image pairs was longer than the time the method used to register them. By introducing pixel and Fourier-Mellin filters, the artifacts of finite discrete Fourier transforms are reduced and accurate registration is achieved. Superior results can be obtained by tuning the G, H and J filters to images from a specific discipline.

In addition to RST transformations, the method is expected to perform well for constant or linear luminance differences between the reference and pattern images. These luminance changes are constant linear functions in the Fourier-Mellin domain, so they are ignored by the normalized correlation function. It is well-known that the value of the normalized pixel correlations used to recover translation is invariant to linear and constant luminance changes.

While there have been described and illustrated herein various methods for registering images, it will be apparent to those skilled in the art that variations and modifications are possible without deviating from the spirit and broad teachings of the invention which shall be limited solely by the scope of the claims appended hereto.

What is claimed is:

1. A method for registering a pattern image with a reference image, wherein the pattern image and the reference image differ from each other by a Rotation-Scale-Translation transformation defined by a scale factor s, a rotation factor φ, and a translation vector (Δx, Δy), the method comprising:

(a) preprocessing the reference image and the pattern image, including the steps of:

(a-1) transforming the reference image and the pattern image from a pixel domain to a Fourier-Mellin domain to provide a transformed reference and a transformed pattern, respectively; and (a-2) converting the transformed reference and the transformed pattern from Cartesian (x, y) coordinates to polar-log ($\log_B$(radius), angle) coordinates, where B is a global constant logarithm base;

(b) recovering at least one potential scale factor, including the steps of:

(b-1) summing the polar-log ($\log_B$(radius), angle) reference and the polar-log ($\log_B$(radius), angle) pattern along the angle axis thereof to provide a reference scale signature and a pattern scale signature, respectively;

(b-2) correlating the reference scale signature with the pattern scale signature using a normalized correlation to provide a correlated scale signature;

(b-3) detecting local maxima of the correlated scale signature which comprise a set of scale signature shifts; and (b-4) raising the logarithm base B to the power of each scale signature shift to provide the at least one potential scale factor;

(c) recovering the rotation factor φ, including the steps of:
  (c-1) summing the polar-log ($\log_B$(radius), angle) reference and the polar-log ($\log_B$(radius), angle) pattern along the $\log_B$(radius) axis thereof to provide a reference rotation signature and a pattern rotation signature, respectively;
  (c-2) correlating the reference rotation signature with the pattern rotation signature using a normalized circular correlation to provide a correlated rotation signature; and
  (c-3) detecting the maximum value of the correlated rotation signature which comprises the rotation factor φ; and
(d) recovering the scale factor s and the translation vector (Δx, Δy), including the steps of:
  (d-1) rotating the pattern image by −φ to provide a rotated pattern;
  (d-2) for each potential scale factor, rescaling the rotated pattern by the inverse of the potential scale factor to provide a candidate pattern;
  (d-3) for each candidate pattern, determining a potential translation vector which, when the candidate pattern is translated by the potential translation vector, produces the highest correlation between the reference image and the translated candidate pattern; and
  (d-4) selecting the translated candidate pattern which produces the highest correlation with the reference image, whereby the potential scale factor and the potential translation vector associated with the selected candidate pattern comprise the actual scale factor s and the actual translation vector (Δx, Δy), respectively.

2. The method of claim 1, wherein the step (a) of preprocessing the reference image and the pattern image further includes the step of wavelet-decomposing the reference image and the pattern image prior to the transforming step (a-1).

3. The method of claim 1, wherein the step (a) of preprocessing the reference image and the pattern image further includes the step of filtering the reference image and the pattern image to prevent artifacts caused by implicit tiling of the reference image and the pattern image prior to the transforming step (a-1).

4. The method of claim 3, wherein the step of filtering to prevent artifacts comprises filtering the reference image and the pattern image with a blur filter to remove the artifacts.

5. The method of claim 1, wherein the step (b) of recovering at least one potential scale factor further includes the step of filtering the reference scale signature and the pattern scale signature after the summing step (b-1) and prior to the correlating step (b-2) to increase the signal-to-noise ratio of the scale signatures.

6. The method of claim 1, wherein the step (c) of recovering the rotation factor φ further includes the step of filtering the polar-log ($\log_B$(radius), angle) reference and the polar-log ($\log_B$(radius), angle) pattern prior to the summing step (c-1) to enhance edges present therein.

7. A method for registering a pattern image with a reference image, wherein the pattern image and the reference image differ from each other by a Rotation-Scale-Translation transformation defined by a scale factor s, a rotation factor φ, and a translation vector (Δx, Δy), wherein the scale factor s is known, the method comprising:
(a) preprocessing the reference image and the pattern image, including the steps of:
  (a-1) transforming the reference image and the pattern image from a pixel domain to a Fourier-Mellin domain to provide a transformed reference and a transformed pattern, respectively; and
  (a-2) converting the transformed reference and the transformed pattern from Cartesian (x, y) coordinates to polar-log ($\log_B$(radius), angle) coordinates, where B is a global constant logarithm base;
(b) recovering the rotation factor φ, including the steps of:
  (b-1) summing the polar-log ($\log_B$(radius), angle) reference and the polar-log ($\log_B$(radius), angle) pattern along the $\log_B$(radius) axis thereof to provide a reference rotation signature and a pattern rotation signature, respectively;
  (b-2) correlating the reference rotation signature with the pattern rotation signature using a normalized circular correlation to provide a correlated rotation signature; and
  (b-3) detecting the maximum value of the correlated rotation signature which comprises the rotation factor φ; and
(c) recovering the translation vector (Δx, Δy), including the steps of:
  (c-1) rotating the pattern image by −φ to provide a rotated pattern;
  (c-2) rescaling the rotated pattern by the inverse of the scale factor s to provide a candidate pattern;
  (c-3) determining the translation vector (Δx, Δy) which, when the candidate pattern is translated by the translation vector (Δx, Δy), produces the highest correlation between the reference image and the translated candidate pattern.

8. The method of claim 7, wherein the step (a) of preprocessing the reference image and the pattern image further includes the step of wavelet-decomposing the reference image and the pattern image prior to the transforming step (a-1).

9. The method of claim 7, wherein the step (a) of preprocessing the reference image and the pattern image further includes the step of filtering the reference image and the pattern image to prevent artifacts caused by implicit tiling of the reference image and the pattern image prior to the transforming step (a-1).

10. The method of claim 9, wherein the step of filtering to prevent artifacts comprises filtering the reference image and the pattern image with a blur filter to remove the artifacts.

11. The method of claim 7, wherein the step (b) of recovering the rotation factor φ further includes the step of filtering the polar-log ($\log_B$(radius), angle) reference and the polar-log ($\log_B$(radius), angle) pattern prior to the summing step (b-1) to enhance edges present therein.

12. A method for registering a pattern image with a reference image, wherein the pattern image and the reference image differ from each other by a Rotation-Scale-Translation transformation defined by a scale factor s, a rotation factor φ, and a translation vector (Δx, Δy), wherein the rotation factor φ is known, the method comprising:
(a) preprocessing the reference image and the pattern image, including the steps of:
  (a-1) transforming the reference image and the pattern image from a pixel domain to a Fourier-Mellin domain to provide a transformed reference and a transformed pattern, respectively; and
  (a-2) converting the transformed reference and the transformed pattern from Cartesian (x, y) coordinates to polar-log ($\log_B$(radius), angle) coordinates, where B is a global constant logarithm base;
(b) recovering at least one potential scale factor, including the steps of:

(b-1) summing the polar-log ($\log_B$(radius), angle) reference and the polar-log ($\log_B$(radius), angle) pattern along the angle axis thereof to provide a reference scale signature and a pattern scale signature, respectively;

(b-2) correlating the reference scale signature with the pattern scale signature using a normalized correlation to provide a correlated scale signature;

(b-3) detecting local maxima of the correlated scale signature which comprise a set of scale signature shifts; and (b-4) raising the logarithm base B to the power of each scale signature shift to provide the at least one potential scale factor; and (c) recovering the scale factor s and the translation vector ($\Delta x$, $\Delta y$), including the steps of:

(c-1) rotating the pattern image by $-\phi$ to provide a rotated pattern;

(c-2) for each potential scale factor, rescaling the rotated pattern by the inverse of the potential scale factor to provide a candidate pattern;

(c-3) for each candidate pattern, determining a potential translation vector which, when the candidate pattern is translated by the potential translation vector, produces the highest correlation between the reference image and the translated candidate pattern; and (c-4) selecting the translated candidate pattern which produces the highest correlation with the reference image, whereby the potential scale factor and the potential translation vector associated with the selected candidate pattern comprise the actual scale factor s and the actual translation vector ($\Delta x$, $\Delta y$), respectively.

13. The method of claim 12, wherein the step (a) of preprocessing the reference image and the pattern image further includes the step of wavelet-decomposing the reference image and the pattern image prior to the transforming step (a-1).

14. The method of claim 12, wherein the step (a) of preprocessing the reference image and the pattern image further includes the step of filtering the reference image and the pattern image to prevent artifacts caused by implicit tiling of the reference image and the pattern image prior to the transforming step (a-1).

15. The method of claim 14, wherein the step of filtering to prevent artifacts comprises filtering the reference image and the pattern image with a blur filter to remove the artifacts.

16. The method of claim 12, wherein the step (b) of recovering at least one potential scale factor further includes the step of filtering the reference scale signature and the pattern scale signature after the summing step (b-1) and prior to the correlating step (b-2) to increase the signal-to-noise ratio of the scale signatures.

17. The method of claim 4, wherein the blur filter blurs edges cyclically around the image to which it is applied.

18. The method of claim 17, wherein the blur filter blurs the edges by smoothing pixels within a predetermined number of pixels of the image border.

19. The method of claim 10, wherein the blur filter blurs edges cyclically around the image to which it is applied.

20. The method of claim 19, wherein the blur filter blurs the edges by smoothing pixels within a predetermined number of pixels of the image border.

21. The method of claim 15, wherein the blur filter blurs edges cyclically around the image to which it is applied.

22. The method of claim 21, wherein the blur filter blurs the edges by smoothing pixels within a predetermined number of pixels of the image border.

* * * * *